No. 803,204. PATENTED OCT. 31, 1905.
J. A. WIDMER.
DUST PAN.
APPLICATION FILED APR. 1, 1905.
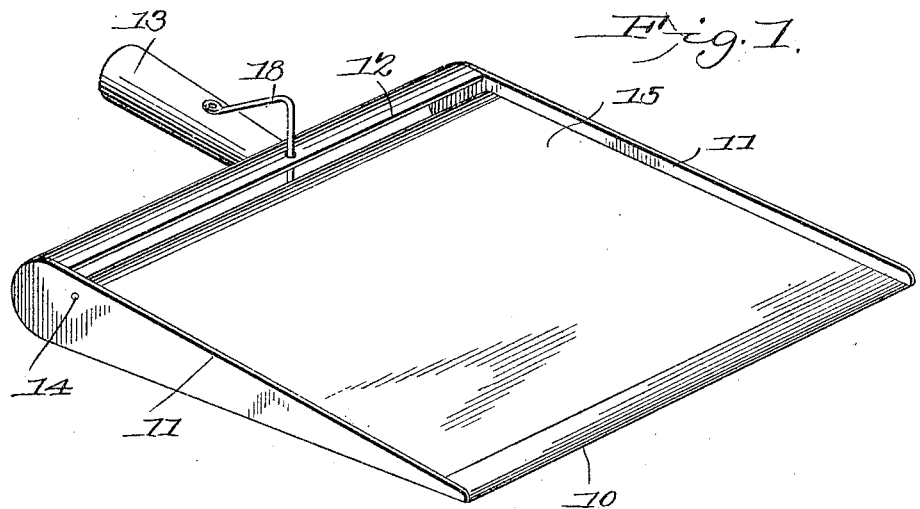
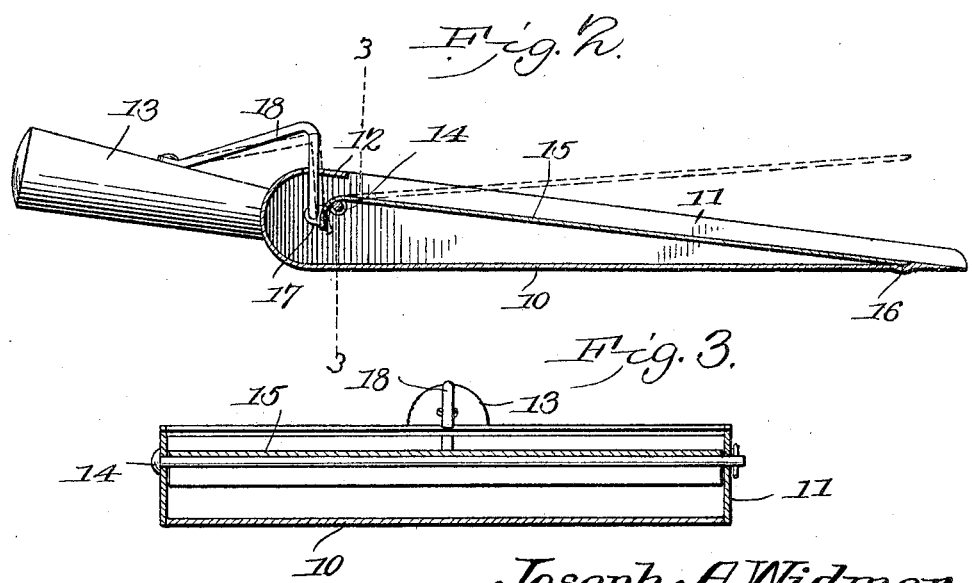
Joseph A. Widmer, Inventor.

UNITED STATES PATENT OFFICE.

JOSEPH A. WIDMER, OF CANYON FERRY, MONTANA.

DUST-PAN.

No. 803,204.        Specification of Letters Patent.        Patented Oct. 31, 1905.

Application filed April 1, 1905. Serial No. 253,297.

*To all whom it may concern:*

Be it known that I, JOSEPH A. WIDMER, a citizen of the United States, residing at Canyon Ferry, in the county of Lewis and Clark and State of Montana, have invented a new and useful Dust-Pan, of which the following is a specification.

This invention relates to dust-pans, the principal object of the invention being to provide a dust-pan having a movable cover arranged to prevent the scattering of the dust in the pan by air-currents, a further object in this connection being to provide a pan in which dust or sweepings may be gathered while the cover is in either open or closed position.

With these and other objects in view, as will more fully hereinafter appear, the invention consists in certain novel features of construction and arrangement of parts hereinafter fully described, illustrated in the accompanying drawings, and particularly pointed out in the appended claim, it being understood that various changes in the form, proportions, size, and minor details of the structure may be made without departing from the spirit or sacrificing any of the advantages of the invention.

In the accompanying drawings, Figure 1 is a perspective view of a dust-pan constructed in accordance with the invention. Fig. 2 is a transverse sectional view of the same. Fig. 3 is a transverse sectional elevation of the same on the line 3 3 of Fig. 2.

Similar numerals of reference are employed to indicate corresponding parts throughout the several figures of the drawings.

The pan 10 is provided with side flanges 11, and the bottom of the pan proper is turned over at the rear end to form an overhanging guard 12, and to the rear of the guard is secured a handle 13 of the usual character.

The vertical flanges 11 are provided with openings for the passage of a transversely-extending spindle 14, on which is mounted a cover 15 of a width approximately equal to the distance between the inner faces of the flanges 11. The forward edge of the cover is seated in a depression 16, formed in the front portion of the pan proper, so that it will be arranged flush with the front portion of the pan, and any sweepings may be gathered by brushing directly over the pan and onto the cover. The rear end of the cover extends within the forward edge of the guard 12 and is curved downward, forming an approximately vertical flange, to which is secured a perforated lug 17, arranged for the reception of one end of an approximately V-shaped spring 18, that extends through an opening formed in the guard, the opposite end of the spring being riveted or otherwise secured to the handle 13 and being arranged within convenient reach of the thumb of the person using the pan.

In using the pan slight downward pressure on the spring 18 will open the cover to the position shown by dotted lines in Fig. 2, and sweepings may be brushed into the pan and the cover allowed to close by relieving the pressure on the spring. Finer sweepings or dust may be gathered while the pan is closed by brushing the same up over the top of the cover 15 and through the space overhanging the guard 12. During this operation the dust will be held from escape laterally by the flanges 11, which extend up above the top of the cover when the latter is in the closed position.

It will be noted that the sweepings are protected from currents of air and will not be accidentally scattered in case a door or window is open when the pan is partly filled with dust. In dumping the contents of the pan it is merely necessary to depress the spring 18 and move the cover to open position. This is found further advantageous in that before the dumping operation the pan may be tilted on edge in order to allow the contents to move to a position adjacent to one of the flanges 11, and then when the cover is opened the stream of dust particles may be directed into a comparatively small receptacle.

It will be seen on reference to Fig. 3 that the spindle 14 is provided at one end with a head and at the opposite end with a passage for the locking-pin, so that by removing the latter the spindle may be withdrawn and the cover separated from the pan for cleaning or other purposes.

Having thus described the invention, what is claimed is—

A dust-pan comprising a bottom portion, the rear end of which is provided with an upwardly and forwardly curved guard, said bottom portion having approximately vertical side flanges, a pivotally-mounted cover arranged below the tops of the flanges when the cover is in closed position, the rear end of the cover being spaced from the guard and extending to the rear of the forward edge of said guard, and a spring secured to the handle and having a portion extending through an opening in the guard, and connected to said cover.

In testimony that I claim the foregoing as my own I have hereto affixed my signature in the presence of two witnesses.

JOSEPH A. WIDMER.

Witnesses:
   FRED E. TIBBETTS,
   T. H. KLEINSCHMIDT.